July 7, 1942.  D. C. SHARP  2,288,851
TOOTH FOR SLIPS
Filed July 18, 1939
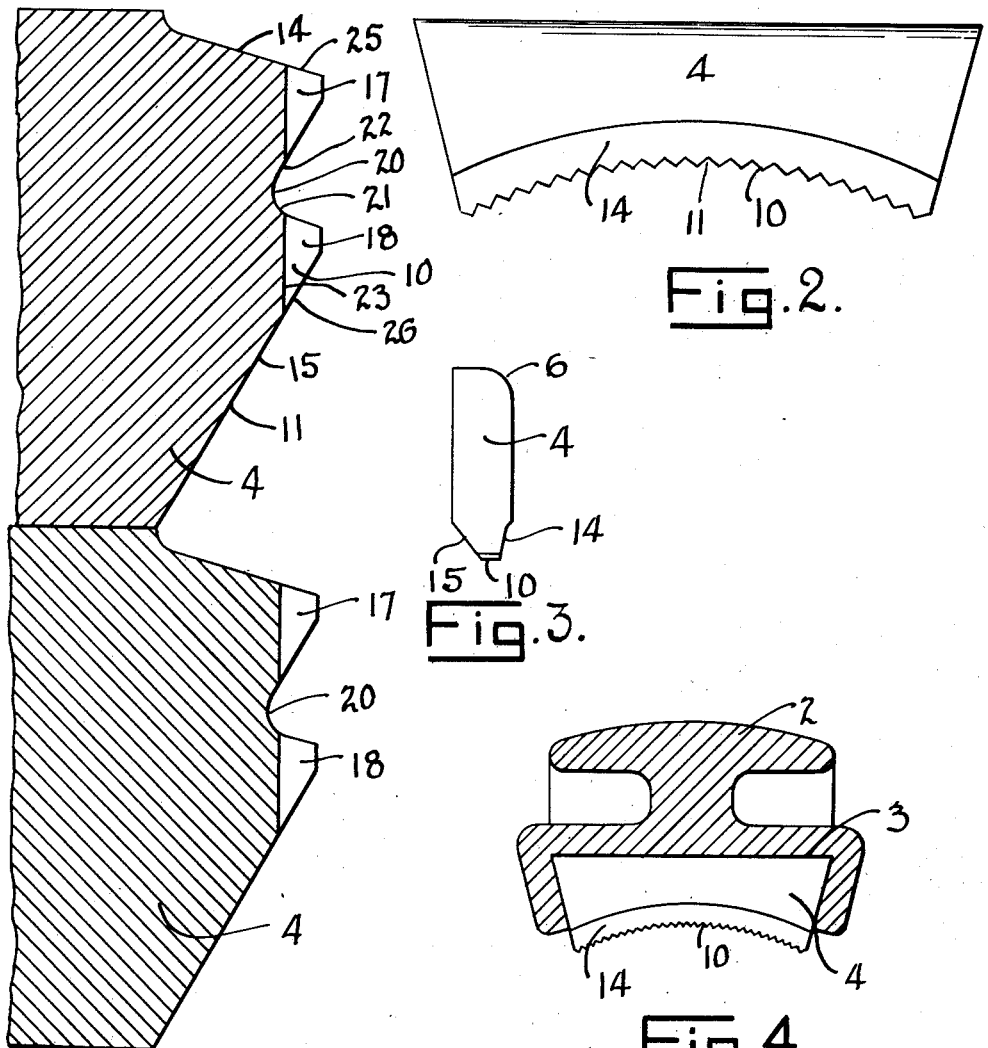
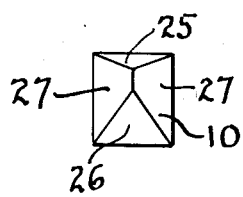
DUDLEY C. SHARP
Jesse P. Stone INVENTOR.
BY Lester B. Clark
ATTORNEYS.

Patented July 7, 1942

2,288,851

UNITED STATES PATENT OFFICE 2,288,851

TOOTH FOR SLIPS

Dudley C. Sharp, Houston, Tex., assignor to Mission Manufacturing Company, a corporation of Texas Application July 18, 1939, Serial No. 285,040

9 Claims. (Cl. 24—263)

The invention relates to a particular type of tooth which is applied to slips for supporting pipe in wells.

In the drilling of oil wells it is necessary to support long heavy strings of pipe in a vertical position in the well bore and various types of slips have been devised which will grip the pipe and suspend it. In the majority of instances, however, these slips are provided with teeth having a configuration which tends to cut into the pipe and particularly with drill pipe where it is repeatedly suspended in the slips it has been found that the pipe is soon cut, damaged or swedged out of shape due to the tremendous loads transferred to the slips and the fact that the teeth of the slip cut into the pipe. It is with a view of providing a peculiarly shaped tooth which will support the load and not materially cut into the pipe that the present type of tooth has been devised.

It is one of the objects of the invention to provide a series of teeth for pipe engaging slips wherein the tooth will be so formed as to grip the pipe and there will be sufficient strength in the tooth due to its configuration to carry the load.

Another object of the invention is to provide a series of teeth for slips arranged in a plurality of rows which are spaced apart by a groove having a surface at the base which is sharper than the upper face.

Another object of the invention is to provide a series of teeth wherein the lower sides of the respective rows of teeth are parallel and of one inclination and the upper faces or sides are also parallel but of a steeper inclination.

Still another object of the invention is to provide a substantially pyramidal shaped tooth for slips.

Other and further objects of the invention will be readily apparent when the following description is considered in connection with the accompanying drawing wherein:

Fig. 1 shows a very much enlarged broken sectional view of the arrangement of the tooth upon pipe engaging dogs of a slip.

Fig. 2 shows a top plan view of one of the dogs or plates which are used in slips and to which the invention is to be applied.

Fig. 3 shows an end view of the plate of Fig. 2.

Fig. 4 is a transverse sectional view thru one of the slips which supports a series of the dogs of Fig. 2.

Fig. 5 is a front view in elevation of one of the teeth to illustrate its pyramidal form.

In Fig. 4 a slip structure is indicated generally at 2. This structure is provided with a front opening 3 into which a series of dogs or plates 4 are inserted. This type of slip is disclosed generally in the patents to Adair No. 1,908,652, issued May 9, 1933, and No. 1,908,675, issued May 16, 1933, which are particularly adapted to the rolling feature of the dogs in the body of the slip, which feature is indicated generally by the curved surface 6 on the upper rear edge of the dog or plate 4. This curve is best seen in Fig. 3.

The present invention directs itself to the configuration of the teeth 10 which are provided on the edge of the plate 4, whereby a tooth is provided which will be exceptionally satisfactory in gripping the pipe and securely supporting the pipe without damage to the pipe.

As seen in Fig. 1 each of the plates 4 are peculiarly formed on the front arcuate face 11 thereof. At this face the upper and lower surfaces are beveled forwardly, converging toward the toothed edge. The bevel of the lower face 15 is inclined at a lesser angle with respect to the vertical than is the upper bevel 14 as is clearly seen in Fig. 1. The faces 14 and 15 do not reach an apex but have the upper row 17 and the lower row 18 of teeth formed between them. These rows of teeth are spaced apart by recess 20 which has a lower side 21 which is substantially parallel to the face 14 and an upper side 22 which is substantially parallel to the face 15.

The inclined faces 14 and 15 extend beyond the base line 23 of the teeth 10 which make up the rows 17 and 18 and merge with the tooth so that the upper side 25 of the teeth 10 in the upper row 17 constitutes a continuation of the face 14 and the lower edge 26 of the teeth 10 in the lower row 18 constitute a continuation of the face 15.

From the foregoing it will be obvious that a substantially pyramidal tooth 10 has been formed, as seen in Fig. 5. The upper edge 25, however, is steeper than the lower edge 26 while the sides 27 are isomeric.

The advantages of a tooth of the construction just defined are that it presents a structure which is engineered to support tremendous loads, but which has forwardly sloping side edges so that it may be forced uniformly against the pipe to be supported. The recesses 20 between the rows of teeth allow for the accumulation therein of foreign matter which might be on the surface of the member being supported, so that as the load is taken by the teeth the foreign material will have an avenue of escape.

Broadly the invention contemplates a particular form of tooth for slips and it is to be understood that this tooth may be applied to the plate-like dogs herein disclosed or it may be applied to the solid face of a unitary slip structure and contemplates the general arrangement of the teeth and the configuration of the tooth as well.

What is claimed is:

1. A support dog for slips comprising a body of metal, a supporting face comprising a plurality of engaging teeth, said teeth being adapted to contact the member to be supported, each tooth comprising a substantially pyramidal projection, said teeth being in a plurality of horizontally spaced rows above the center of the body.

2. A support dog for slips comprising a body of metal, a supporting face thereon, a plurality of engaging teeth on said face, said teeth being adapted to contact the member to be supported, each tooth comprising a substantially pyramidal projection, said teeth being in a plurality of vertically spaced rows with a recess into said body below the base of the teeth spacing the rows apart.

3. A support dog for slips comprising a body of metal, a supporting face thereon, a plurality of engaging teeth on said face, said teeth being adapted to contact the member to be supported, each tooth comprising a substantially pyramidal projection, said teeth being in a plurality of vertically spaced rows with a recess into said body beyond the base of the teeth spacing the rows apart, said recess having a curved base merging into the lower and upper faces of the teeth in the row above and below respectively.

4. A support dog for slips including a plate like member, a face thereon, a series of teeth thereon arranged in two rows, said face having upper and lower sides inclined toward each other with the top side merging into the top face of the top row of teeth and the lower side merging into the lower side of the lower row of teeth, and a recess spacing said rows of teeth apart, the lower side of said recess being parallel to the upper side of said face and the upper side of the recess being parallel to the lower side of said face so that both rows of teeth are disposed above the center of the plate member.

5. A support dog for slips comprising a plate like member, a straight back edge thereon, a curved forward edge of less length than said back edge, inclined ends joining said edges, and pipe engaging teeth on the curved forward edge comprising two horizontal rows of pyramidal teeth, both rows being disposed above the horizontal center of the face.

6. A support dog for slips comprising a plate like member, a straight back edge thereon, a curved forward edge of less length than said back edge, inclined ends joining said edges, and pipe engaging teeth on the curved forward edge comprising two horizontal rows of pyramidal teeth, both rows being disposed above the horizontal center of the face, top and bottom inclined faces on said forward edge inclined toward each other and forming the top of the top row of teeth and the bottom of the bottom row of teeth respectively.

7. A support dog for slips comprising a plate like member, a straight back edge thereon, a curved forward edge of less length than said back edge, inclined ends joining said edges, and pipe engaging teeth on the curved forward edge comprising two horizontal rows of pyramidal teeth, both rows being disposed above the horizontal center of the face, top and bottom inclined faces on said forward edge inclined toward each other and forming the top of the top row of teeth and the bottom of the bottom row of teeth respectively and a recess spacing the rows of teeth whose top face forms the lower side of the top row of teeth and whose lower side forms the top of the bottom row of teeth.

8. A support dog for slips comprising a plate like member, a straight back edge thereon, a curved forward edge of less length than said back edge, inclined ends joining said edges, and pipe engaging teeth on the curved forward edge comprising two horizontal rows of pyramidal teeth, both rows being disposed above the horizontal center of the face, top and bottom inclined faces on said forward edge inclined toward each other and forming the top of the top row of teeth and the bottom of the bottom row of teeth respectively and a recess spacing the rows of teeth whose top face forms the lower side of the top row of teeth and whose lower side forms the top of the bottom row of teeth, said recess faces being parallel to the bottom and top faces of said forward edge.

9. A tooth for slips for supporting a string of pipe in an earth borehole, comprising a support body, a projection including a base integral with said support, said projection being defined by a series of flat surfaces disposed in inclined planes having a common convergence, said planes being inclined in elevation so that the apex is a vertical line extending above the geometric center of the base of said tooth when said tooth is engaged with said pipe.

DUDLEY C. SHARP.